(12) United States Patent
Jones et al.

(10) Patent No.: US 7,707,498 B2
(45) Date of Patent: Apr. 27, 2010

(54) SPECIFIC TYPE CONTENT MANAGER IN AN ELECTRONIC DOCUMENT

(75) Inventors: Brian M. Jones, Redmond, WA (US);
Marcin Sawicki, Kirkland, WA (US);
Robert A. Little, Redmond, WA (US);
Tristan A. Davis, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/955,612

(22) Filed: Sep. 30, 2004

(65) Prior Publication Data

US 2006/0069987 A1    Mar. 30, 2006

(51) Int. Cl.
*G06F 17/00* (2006.01)
(52) U.S. Cl. .................. 715/273; 715/243; 715/255
(58) Field of Classification Search ................. 715/505, 715/517–521, 526, 273, 243, 255
See application file for complete search history.

(56) References Cited

U.S. PATENT DOCUMENTS

| | | | |
|---|---|---|---|
| 5,287,504 A | 2/1994 | Carpenter et al. | 707/201 |
| 5,440,745 A | 8/1995 | Platte et al. | 718/101 |
| 5,630,131 A | 5/1997 | Palevich et al. | 717/108 |
| 5,715,415 A * | 2/1998 | Dazey et al. | 715/708 |
| 5,717,741 A | 2/1998 | Yue et al. | 379/88.12 |
| 5,787,449 A | 7/1998 | Vulpe et al. | 715/203 |
| 5,845,299 A | 12/1998 | Arora et al. | 715/209 |
| 5,903,902 A * | 5/1999 | Orr et al. | 715/202 |
| 5,910,075 A | 6/1999 | Arnell et al. | 49/25 |
| 5,911,068 A | 6/1999 | Zimmerman et al. | 719/328 |
| 5,974,430 A | 10/1999 | Mutschler et al. | 715/505 |
| 5,991,878 A | 11/1999 | McDonough et al. | 726/9 |
| 6,006,239 A | 12/1999 | Bhanssali et al. | 707/201 |
| 6,014,677 A | 1/2000 | Hayashi et al. | 707/501 |
| 6,088,431 A | 7/2000 | LaDue | 379/114.2 |

(Continued)

FOREIGN PATENT DOCUMENTS

KR    2004-0020933 A    3/2004

(Continued)

OTHER PUBLICATIONS

Habraken, Jr., StarOffice 5.2 Calc Handbook, Prentice Hall, Dec. 2000, Chapter 2, 5 pp.

(Continued)

*Primary Examiner*—Amelia Rutledge
(74) *Attorney, Agent, or Firm*—Merchant & Gould

(57) ABSTRACT

A method, apparatus, and computer-readable medium are provided for managing specific types of content in an electronic document. A user interface is provided for displaying a specific type of content in a predefined area of and electronic document. The user interface includes a content region for receiving the specific type of content and displaying the specific type of content within a predefined boundary. The user interface also includes a selection region for receiving a selection of content for insertion into the content region. The user interface validates the content received in the content region based on the specific type of content defined for the content region and based on a predefined content limit. The specific type of content received in the content region may be formatted according to a predetermined format and may also be bound to a data source external to the electronic document.

20 Claims, 5 Drawing Sheets

U.S. PATENT DOCUMENTS

| | | | | |
|---|---|---|---|---|
| 6,157,940 | A | 12/2000 | Marullo et al. | 703/27 |
| 6,247,020 | B1 * | 6/2001 | Minard | 707/104.1 |
| 6,268,851 | B1 * | 7/2001 | Bricklin et al. | 715/744 |
| 6,275,824 | B1 | 8/2001 | O'Flaherty et al. | 707/9 |
| 6,317,777 | B1 | 11/2001 | Skarbo et al. | 709/204 |
| 6,397,351 | B1 | 5/2002 | Miller et al. | 714/13 |
| 6,457,002 | B1 | 9/2002 | Beattie et al. | 707/3 |
| 6,490,601 | B1 | 12/2002 | Markus et al. | 715/507 |
| 6,507,856 | B1 | 1/2003 | Chen et al. | 715/205 |
| 6,562,076 | B2 | 5/2003 | Edwards et al. | 715/229 |
| 6,571,253 | B1 | 5/2003 | Thompson et al. | 707/103 R |
| 6,629,843 | B1 | 10/2003 | Bunting et al. | 434/118 |
| 6,731,314 | B1 | 5/2004 | Cheng et al. | 715/848 |
| 6,859,821 | B1 | 2/2005 | Ozzie et al. | 709/205 |
| 6,865,599 | B2 | 3/2005 | Zhang | 709/218 |
| 6,915,482 | B2 | 7/2005 | Jellum et al. | 715/234 |
| 6,920,455 | B1 | 7/2005 | Weschler | 707/100 |
| 6,944,622 | B1 | 9/2005 | Mitchell et al. | 707/102 |
| 6,944,662 | B2 | 9/2005 | Devine et al. | 709/225 |
| 6,950,990 | B2 | 9/2005 | Rajarajan et al. | 715/736 |
| 6,996,769 | B1 | 2/2006 | Peikes et al. | 715/205 |
| 7,017,112 | B2 | 3/2006 | Collie et al. | 715/513 |
| 7,035,839 | B1 | 4/2006 | Gillespie et al. | 707/2 |
| 7,039,708 | B1 | 5/2006 | Knobl et al. | 709/227 |
| 7,039,863 | B1 | 5/2006 | Caro et al. | 715/517 |
| 7,085,773 | B2 | 8/2006 | Dorsett, Jr. | 707/104.1 |
| 7,111,284 | B2 | 9/2006 | Takagi et al. | 717/136 |
| 7,117,504 | B2 | 10/2006 | Smith et al. | 719/328 |
| 7,200,816 | B2 | 4/2007 | Falk et al. | 715/762 |
| 7,237,002 | B1 | 6/2007 | Estrada et al. | 709/203 |
| 7,340,481 | B1 * | 3/2008 | Baer et al. | 707/104.1 |
| 7,386,563 | B1 | 6/2008 | Pal | 707/102 |
| 7,509,305 | B2 | 3/2009 | Tozawa et al. | 707/3 |
| 7,562,342 | B2 | 7/2009 | Berg et al. | 717/108 |
| 2001/0056463 | A1 | 12/2001 | Grady et al. | 709/203 |
| 2002/0010716 | A1 | 1/2002 | McCartney et al. | 707/517 |
| 2002/0013792 | A1 | 1/2002 | Imielinski et al. | 707/523 |
| 2002/0065110 | A1 | 5/2002 | Enns et al. | 455/566 |
| 2002/0085020 | A1 | 7/2002 | Carroll, Jr. | 345/700 |
| 2002/0107867 | A1 | 8/2002 | Takagi et al. | 707/102 |
| 2002/0133516 | A1 | 9/2002 | Davis et al. | 707/513 |
| 2002/0161801 | A1 | 10/2002 | Hind et al. | 715/513 |
| 2002/0198962 | A1 | 12/2002 | Horn et al. | 709/218 |
| 2003/0007009 | A1 | 1/2003 | Haley | 345/805 |
| 2003/0018666 | A1 | 1/2003 | Chen et al. | 707/513 |
| 2003/0018714 | A1 | 1/2003 | Mikhailov et al. | 709/203 |
| 2003/0023632 | A1 | 1/2003 | Ries et al. | 715/741 |
| 2003/0023953 | A1 | 1/2003 | Lucassen et al. | 717/106 |
| 2003/0051054 | A1 | 3/2003 | Redlich et al. | 709/246 |
| 2003/0097457 | A1 | 5/2003 | Saran et al. | 709/230 |
| 2003/0159111 | A1 | 8/2003 | Fry | 715/513 |
| 2003/0163603 | A1 | 8/2003 | Fry et al. | 709/328 |
| 2003/0164859 | A1 * | 9/2003 | Evans | 345/792 |
| 2003/0174162 | A1 | 9/2003 | Wu | 345/736 |
| 2004/0021679 | A1 | 2/2004 | Chapman et al. | 345/700 |
| 2004/0073565 | A1 | 4/2004 | Kaufman et al. | 707/101 |
| 2004/0088332 | A1 | 5/2004 | Lee et al. | 707/200 |
| 2004/0088647 | A1 | 5/2004 | Miller et al. | 715/234 |
| 2004/0098667 | A1 | 5/2004 | Atkinson | 715/513 |
| 2004/0103147 | A1 | 5/2004 | Flesher et al. | 709/204 |
| 2004/0111672 | A1 | 6/2004 | Bowman et al. | 715/760 |
| 2004/0153467 | A1 | 8/2004 | Conover et al. | 707/100 |
| 2004/0183830 | A1 | 9/2004 | Cody et al. | 345/752 |
| 2004/0199876 | A1 | 10/2004 | Ethier et al. | 715/249 |
| 2004/0205565 | A1 | 10/2004 | Gupta | 715/513 |
| 2004/0205653 | A1 | 10/2004 | Hadfield et al. | 715/255 |
| 2004/0217985 | A9 | 11/2004 | Ries et al. | 715/741 |
| 2004/0220926 | A1 | 11/2004 | Lamkin et al. | 770/3 |
| 2004/0225958 | A1 | 11/2004 | Halpert et al. | 715/513 |
| 2004/0237036 | A1 | 11/2004 | Qulst et al. | 715/236 |
| 2004/0243938 | A1 | 12/2004 | Weise et al. | 715/526 |
| 2004/0268240 | A1 | 12/2004 | Vincent | 715/234 |
| 2005/0014494 | A1 | 1/2005 | Owen et al. | 455/419 |
| 2005/0027618 | A1 | 2/2005 | Zucker et al. | 705/26 |
| 2005/0033667 | A1 | 2/2005 | Sugimoto et al. | 705/28 |
| 2005/0033766 | A1 | 2/2005 | Pang et al. | 707/104.1 |
| 2005/0034079 | A1 | 2/2005 | Gunasekar et al. | 715/753 |
| 2005/0044145 | A1 | 2/2005 | Quinn et al. | 709/205 |
| 2005/0050066 | A1 | 3/2005 | Hughes | 707/100 |
| 2005/0068913 | A1 | 3/2005 | Tan et al. | 370/310 |
| 2005/0071477 | A1 | 3/2005 | Evans et al. | 709/228 |
| 2005/0076295 | A1 * | 4/2005 | Simske et al. | 715/517 |
| 2005/0086384 | A1 | 4/2005 | Ernst | 709/248 |
| 2005/0091346 | A1 | 4/2005 | Krishnaswami et al. | 709/220 |
| 2005/0091576 | A1 | 4/2005 | Relyea et al. | 715/502 |
| 2005/0114771 | A1 | 5/2005 | Piehler et al. | 715/264 |
| 2005/0154978 | A1 | 7/2005 | Albornoz et al. | 715/513 |
| 2005/0183001 | A1 | 8/2005 | Carter et al. | 715/501.1 |
| 2005/0187973 | A1 | 8/2005 | Brychell et al. | 707/104.1 |
| 2005/0188349 | A1 | 8/2005 | Bent et al. | 717/106 |
| 2005/0188350 | A1 | 8/2005 | Bent et al. | 717/106 |
| 2005/0289457 | A1 | 12/2005 | Obasanjo et al. | 715/513 |
| 2006/0031755 | A1 | 2/2006 | Kashi | 715/201 |
| 2006/0036692 | A1 | 2/2006 | Morinigo et al. | 709/206 |
| 2006/0041558 | A1 | 2/2006 | McCauley et al. | 707/10 |
| 2006/0048112 | A1 | 3/2006 | Thiagarajan et al. | 717/144 |
| 2006/0053158 | A1 | 3/2006 | Hall et al. | 707/102 |
| 2006/0053194 | A1 | 3/2006 | Schneider et al. | 709/204 |
| 2006/0069987 | A1 | 3/2006 | Jones et al. | 715/520 |
| 2006/0069989 | A1 | 3/2006 | Jones et al. | 715/526 |
| 2006/0080590 | A1 | 4/2006 | Jones et al. | 715/500 |
| 2006/0136441 | A1 | 6/2006 | Fujisaki | 707/101 |
| 2006/0150085 | A1 | 7/2006 | Davis et al. | 715/513 |
| 2006/0195413 | A1 | 8/2006 | Davis et al. | 707/1 |
| 2006/0195454 | A1 | 8/2006 | Davis et al. | 707/100 |
| 2006/0195777 | A1 | 8/2006 | Davis et al. | 715/500 |
| 2006/0195783 | A1 | 8/2006 | Davis et al. | 715/513 |
| 2006/0282452 | A1 | 12/2006 | Takagi et al. | 707/101 |
| 2007/0061382 | A1 | 3/2007 | Davis et al. | 707/201 |
| 2007/0118554 | A1 | 5/2007 | Chang et al. | |

FOREIGN PATENT DOCUMENTS

| | | | |
|---|---|---|---|
| KR | 2004-0034327 | A | 4/2004 |
| WO | WO 01/08033 | A2 | 2/2001 |
| WO | WO 01/08033 | A3 | 2/2001 |
| WO | WO 01/11486 | A2 | 2/2001 |
| WO | WO 01/11486 | A3 | 2/2001 |
| WO | WO 01/15004 | A2 | 3/2001 |
| WO | WO 01/95515 | A2 | 12/2001 |
| WO | WO 01/95515 | A3 | 12/2001 |

OTHER PUBLICATIONS

Comai et al., "Computing Graphical Queries Over XML Data", ACM Transactions on Information Systems TOIS, Oct. 2001, ACM Press, vol. 19 No. 4, 371-430 pp.

Leslie, "Using Javadoc and XML to Produce API reference Documentation", SIGDOC '02, Oct. 23, 2002, AMC Press, p. 104-109.

Sun et al., "Operational Transformation for Collaborative Word Processing", Proceedings of the Conference of CSCW'04, Nov. 10, 2004, ACM Press, p. 437-446.

Official Action in U.S. Appl. No. 11/030,423 dated Nov. 22, 2006.
Official Action in U.S. Appl. No. 11/030,423 dated May 15, 2007.
Official Action in U.S. Appl. No. 11/066,083 dated Jun. 4, 2007.
Official Action in U.S. Appl. No. 11/066,117 dated Jun. 21, 2007.
Official Action in U.S. Appl. No. 11/067,383 dated Jun. 28, 2007.
Official Action in U.S. Appl. No. 11/030,423 dated Oct. 4, 2007.
Official Action in U.S. Appl. No. 11/066,117 dated Feb. 15, 2008.
European Search Report dated Dec. 19, 2007 in EP 05112126.7.
European Search Report dated Dec. 19, 2007 in EP 05112131.7.
European Examination Report dated Mar. 3, 2008 in EP 05112126.7.
European Examination Report dated Mar. 3, 2008 in EP 05112131.7.
Altova, xmlspy5: User & Reference Manual:, Jan 3, 2003, www.altova.com, pp. 13-30, 698-701, 890.

Narravula et al., "Supporting Strong Coherency for Active Caches in Multi-Tier Data-Centers over InfiniBand," 2004, ANL.gov, pp. 1-10, <Retrieved from CiteseerX May 5, 2009>.

Narravula et al., "Designing Efficient Cooperative Caching Schemes for Multi-Tier Data Centers over RDMA-enabled Networks," Jun. 2005, OCU-CISRC-6/05-TR39, Cover Page, pp. 1-10, <Retrieved from internet May 5, 2009>.

Ladd et al., "Using HTML, 4, XML and Java 1.2", Que, Platinum Edition, Dec. 1998, pp. 693-701.

Souchon et al., "A Review of XML-compliant User-Interface Description Languages," LNCS, copyright Springer-Verlag 2003, pp. 377-391.

Meyer, "A Tool-Creating Validated XML Documents on the Fly Using MS Word," SIGDOC, copyright Oct. 2002, ACM, pp. 113-121.

Sun_Micro, "How to Write Doc Comments for the Javadoc Tool," Sep. 2004, pp. 1-16, <Retrieved from web.archive.org Oct 4, 2008>.

C. Mascolo et al., "XMiddle: A Data-Sharing Middleware for Mobile Computing," Wireless Personal Communications, Springer, Dordrecht, NL, vol. 21, No. 1, Apr. 1, 2002, pp. 77-103.

Bodart et al., "Architecture elements for highly-interactive business-oriented applications," Lecture Notes in Computer Science, Springer Berlin/Heidelberg, vol. 753/1993, Copyright 1993, pp. 83-104 (14917.0059USI1).

* cited by examiner

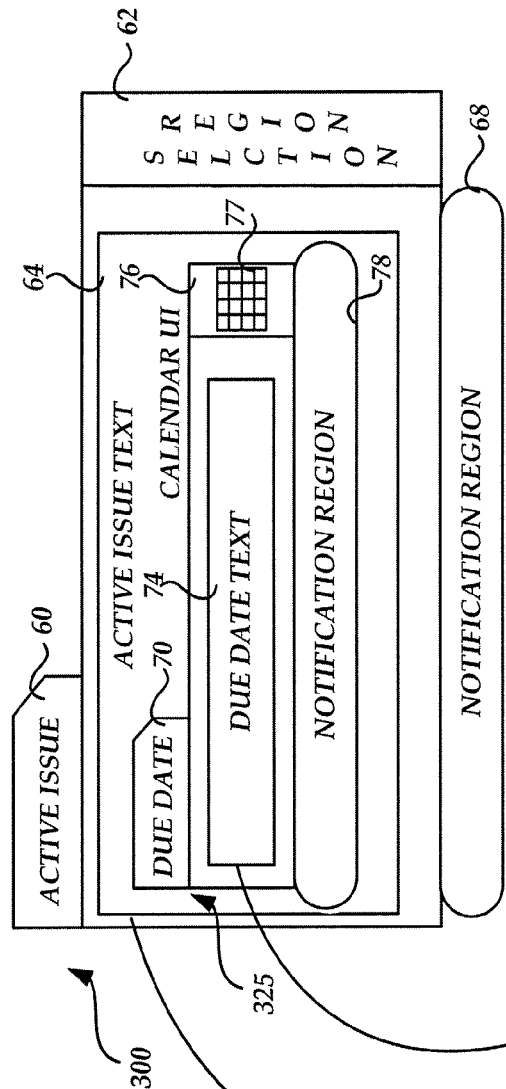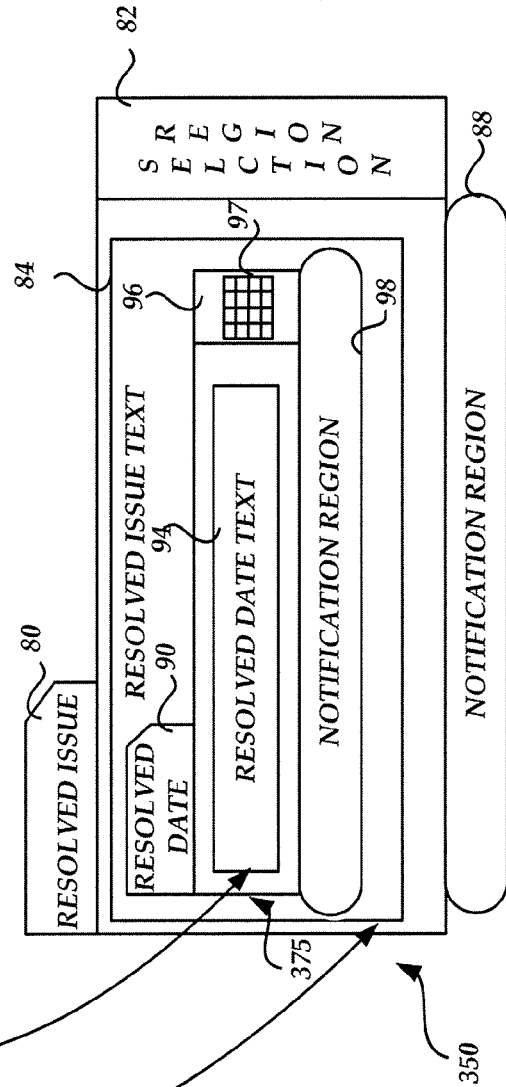

SPECIFIC TYPE CONTENT MANAGER IN AN ELECTRONIC DOCUMENT

BACKGROUND OF THE INVENTION

Modern word processors enable a user to readily create and insert various types of content (e.g., text, pictures, etc.) in an electronic document. In addition, modern word processors enable a user to conform individual types of content to a variety of formats. For example, text may be inserted in a document in paragraph form or as word fragments with different individual formatting properties (e.g., bold, italic, underline, font color, font size) or with no formatting at all. The freeform entry of content allowed by modern word processors, however, suffers from several drawbacks.

One drawback associated with content entry with many modern word processors is that it is often difficult for a user to readily insert, identify, and manipulate regions of the document or template which require different types of content (e.g., a specific fragment of text or a picture) in a document without either manually typing the content in or scanning another document, finding and manually selecting the location for the desired content, and then creating or moving the desired content from another location in the document to the desired location. Even if a predefined set of document fragments (i.e., content blobs) are available for insertion into the document, the document cannot express which pieces of content are valid in any specific location, other than by including static informational text which the user must read, understand, and voluntarily adhere to. Since conventional word processors do not label the locations where the different types of content (predefined or not) may be inserted in an electronic document, they do not permit a user to quickly identify the locations of interest for the insertion of specific content. In addition, conventional word processors do not easily enable associating data from external data sources with specific formatted content within an electronic document.

It is with respect to these considerations and others that the various embodiments of the present invention have been made.

BRIEF SUMMARY OF THE INVENTION

In accordance with the present invention, the above and other problems are solved by a method, apparatus, and computer-readable medium for managing specific types of content in an electronic document. According to one aspect of the invention, a method is provided for receiving and displaying restrictions on specific types of content which can be inserted in at least one predefined area of an electronic document. The method includes receiving a selection of an interactive content pane or a dropdown-like user interface for displaying a specific type of content in at least one predefined area in the electronic document, displaying a content region for receiving the specific type of content in the interactive content pane, receiving the specific type of content in the content region, and displaying the specific type of content within a predefined boundary, wherein the limits on the area of the predefined boundary are based on the specific type of content allowed in the content region.

In receiving the specific type of content in the content region, the method may further include displaying instructional text in the content region for identifying and alerting the user to the specific type of content and receiving the specific type of content in replacement of the instructional text in the content region. In receiving the specific type of content in replacement of the instructional text in the content region, the method may further include displaying in a selection region a plurality of content based on the specific type of content, receiving a selection from the plurality of content in the selection region, and receiving the selected content from the selection region as the specific content in replacement of the instructional text in the content region. The method may further include validating content received in the content region based on the specific type of content and validating the specific type of content received in the content region based on a predefined content limit or other logic defined by a document or template author. If the content received in the content region does not correspond to the specific type of content requested, the method includes generating a first error message in a notification region and if the specific type of content exceeds the predefined content limit, then the method includes generating a second error message in the notification region. The method may further include formatting the specific type of content received in the content region according to a predetermined format, restricting the deletion of the specific type of content in the content region, and binding the specific content in the content region to a data source external to the electronic document.

According to another aspect of the invention, a method is provided for navigating among specific types of content in a plurality of predefined areas of an electronic document. The method includes receiving a specific type of content in a first content region in a first predefined area of the plurality of predefined areas in the electronic document, receiving the specific type of content in a second content region in a second predefined area of the plurality of predefined areas in the electronic document, receiving a jump command in the first content region, and in response to receiving the jump command, moving an insertion point in the first content region to the second content region and automatically selecting the content in the second content region. The method may further include sharing data in the second content region associated with the specific type of content received in the first content region.

According to another aspect of the invention, a user interface is provided for receiving and displaying specific types of content for insertion in at least one predefined area of an electronic document. The user interface includes an interactive content pane which includes a content region for receiving and displaying a specific type of content in the at least one predefined area of the electronic document, a selection region for selecting the specific type of content to be displayed in the content region from a plurality of content, and a label for identifying the specific type of content selected in the selection region. The interactive content pane may further include a boundary for defining the content region for receiving and displaying the specific type of content, a notification region for communicating error messages when content received in the content region does not correspond to the specific type of content and when the specific type of content received in the content region exceeds a predefined content limit, and a handle for moving the content pane from the at least one predefined area in the electronic document to any other valid location in the electronic document. The interactive content pane may further include an embedded interactive content pane for receiving the specific type of content received in the content region. The embedded interactive content pane may share data associated with the specific type of content received in the content region. The specific type of content may include text data, calendar data, table data, and graphics data. The specific type of content may be received in the content region from a data source external to the electronic document.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

BRIEF DESCRIPTION OF THE SEVERAL VIEWS OF THE DRAWINGS

FIGS. 3A and 3B are a block diagram of embedded interactive content panes according to an illustrative embodiment of the present invention;

DETAILED DESCRIPTION OF THE INVENTION

Figure 1:
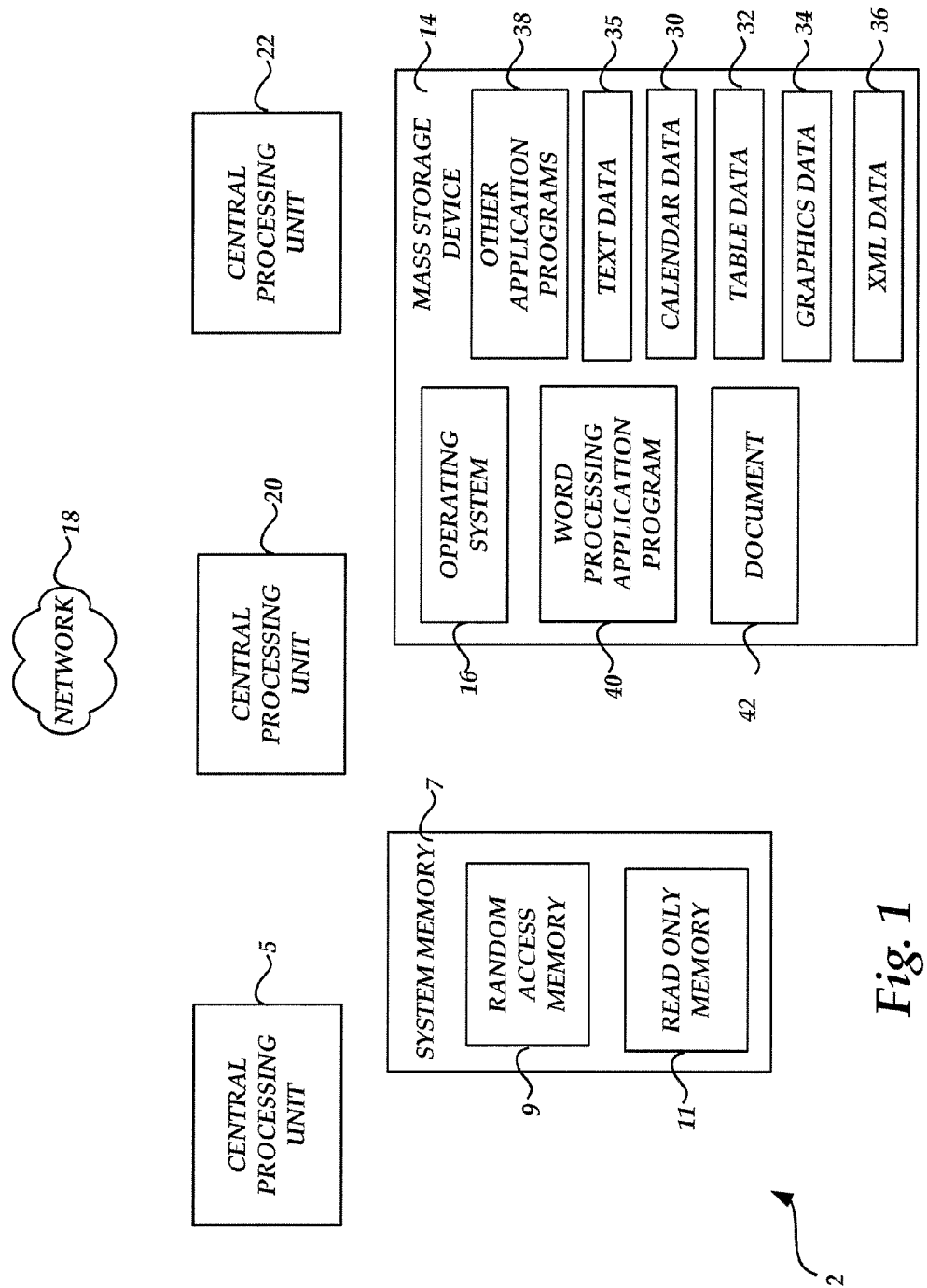
FIG. 1 is a computer system architecture diagram illustrating a computer system utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a word processing application program 40. As known to those skilled in the art, the word processing application program 40 is operative to provide functionality for creating and editing electronic documents, such as document 48. According to one embodiment of the invention, the word processing application program 40 comprises the WORD word processing application program from MICROSOFT CORPORATION. It should be appreciated, however, that word processing application programs from other manufacturers may be utilized to embody the various aspects of the present invention. It should further be appreciated that the various aspects of the present invention are not limited to word processing application programs but may also utilize other application programs 38 which are capable of processing various forms of content (e.g. text or pictures), such as spreadsheet application programs.

In conjunction with the editing of a word processing document, the word processing application program 40 provides functionality for allowing a user to insert specific types of content into various locations in the document 42. For instance, according to embodiments of the invention, a user may utilize an interactive content pane generated by the word processing application program 40 which serves as a placeholder for inserting text such as a paragraph for the "Objective" section of a resume, in an appropriate section the document 42. A user may utilize other interactive content panes generated by the word processing application program 40 for inserting text (which may be arbitrarily restricted by the document's author), a date 30, a table 32, or graphics data 34 (i.e., pictures). Alternatively, a user may also define customized content as one of a set of "document parts" which may be inserted into an interactive content pane. It should be appreciated that the word processing application program 40 may utilize interactive content panes to restrict the specific types of content which may be entered into the document 42.

According to various embodiments of the invention, the word processing application program 40 is also operative to provide functionality for generating interactive content panes which serve as bindings between areas of the document 42 and an external data source, such as Extensible Markup Language ("XML") data 36. As is understood by those skilled in the art, XML is a standard format for communicating data. In the XML data format, a schema is used to provide XML data with a set of grammatical and data type rules governing the types and structure of data that may be communicated. For instance, the XML data 36 may include rules restricting the number of characters in the interactive content pane or restricting the deletion of interactive content panes displayed in a document. Thus, the content entered into the interactive content pane may be automatically validated according to an external user-defined XML schema. Interactive content panes which are generated by the word processing program application 40 will be discussed in greater detail in the description of FIG. 2, below.

Figure 2:
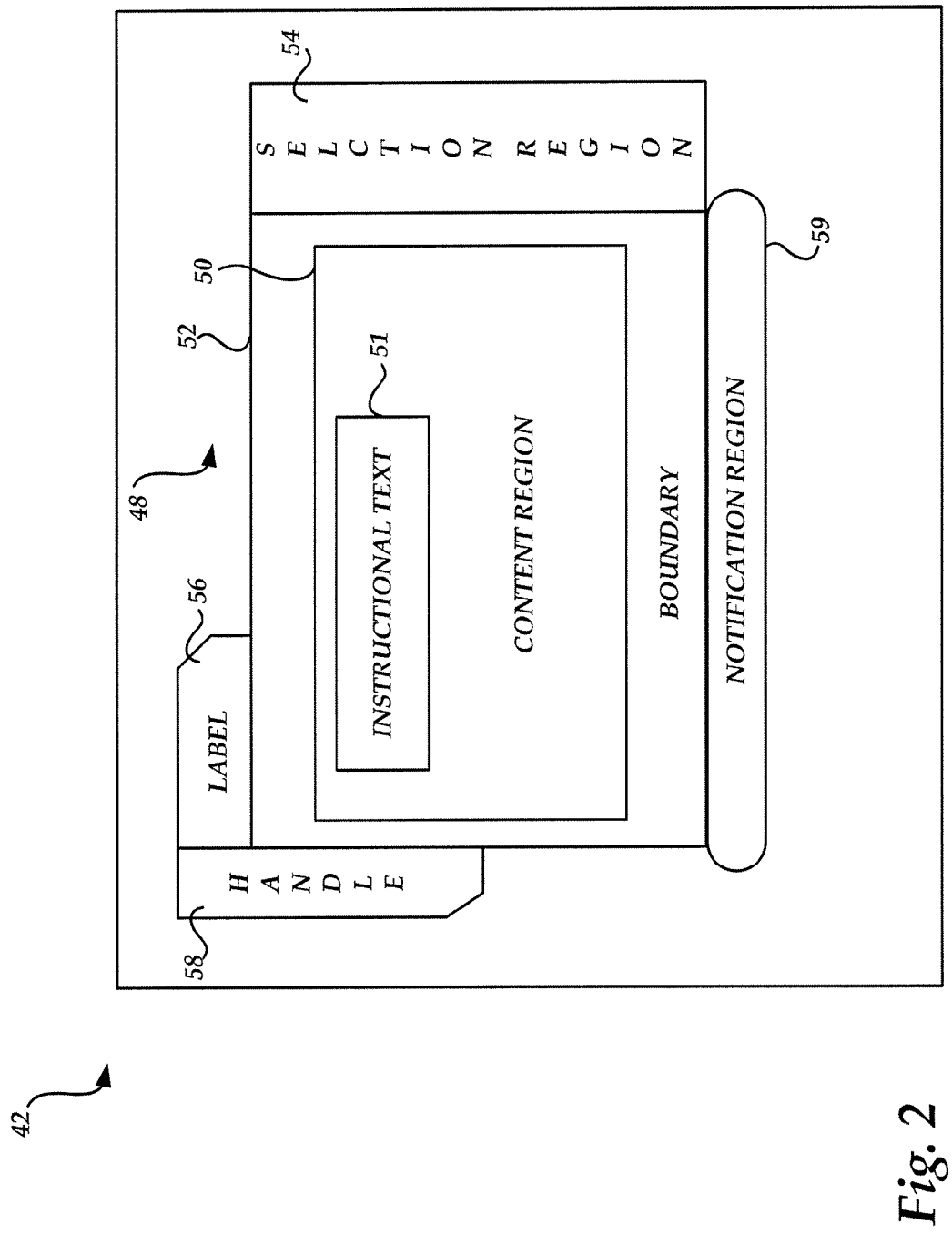
FIG. 2 is a block diagram of an interactive content pane according to an illustrative embodiment of the present invention.

Referring now to FIG. 2, an interactive content pane 48 is shown according to an illustrative embodiment of the present invention. The interactive content pane 48 includes a content region 50 for receiving and displaying specific types of content (e.g., text, graphics data, calendar data, or table data) in the document 42. The content region 50 includes a place for instructional text 51 which provides instructions for inserting specific content whenever the content region is empty. For instance, a content region for inserting an "Objective" paragraph in a resume document may include instructional text such as "Please insert your objective paragraph here." It will be appreciated that the instructional text may be tailored to the specific content to be received in the content region of an interactive content pane. For instance, a graphics data or picture content region may include instructional text such as "Insert your photo here." It should be understood that once a user clicks in the content region 50 containing the instructional text 51, the instructional text disappears to allow the user to insert the specific content.

As shown in FIG. 2, the interactive content pane 48 also includes a boundary 52, a selection region 54, a label 56, a handle 58, and a notification region 59. The boundary 52 defines limits for the content region 50 for receiving and displaying the specific type of content. In one illustrative embodiment, the boundary 52 may fix the area of the content region 50 to a specific size. For instance, the content region for a single paragraph interactive content pane may be limited to fifteen lines of text. Once this limit is reached, no further text is permitted to be entered into the content region.

The selection region 54 is a user interface for selecting specific types of content from similar content, for display in the content region 50. For instance, a selection region in an interactive content pane for inserting calendar data may include a user interface for selecting a date from a calendar for insertion in a document. The selection region 54 may also display a user with choices from a list of predefined items in a dropdown list, for example. It will be appreciated that in one illustrative embodiment, the user interface in the selection region 54 may automatically be generated when a user clicks in the content region of certain types of interactive content regions. For instance, a user clicking into an interactive content region defined for inserting calendar data can automatically generate a calendar user interface for a user to select a specific date.

The label 56 identifies the specific type of content (e.g., dates) which may be entered into the content region 50. The handle 58 is utilized to "drag" the interactive content region 48 to different areas of a displayed document. The notification region 59 is utilized to communicate messages to a user. It should be understood that the word processing application program 40 includes functionality for validating specific content entered into the content region 50. Thus, the notification region 59 may communicate error messages when content received in the content region does not correspond to the specific type of content for an interactive content pane or when the specific type of content received in the content region exceeds a predefined content restriction (e.g., the number of lines or characters in a paragraph).

Referring now to FIGS. 3A and 3B, embedded interactive content panes 300, 325, 350, and 375 are shown according to an illustrative embodiment of the present invention. It will be appreciated that the interactive content panes 300, 325, 350, and 375 are similar to the interactive content pane 48 discussed above with respect to FIG. 2. As shown in FIG. 3A, the interactive content pane 300 includes an "Active Issue" label 60, a selection region 62, a content region 64 for receiving "Active Issue Text," and a notification region 68. Embedded interactive content pane 325 includes a "Due Date" label 70, a content region 74 for receiving "Due Date Text," a selection region 76 (including a calendar user interface 77) and a notification region 78. It will be appreciated that the calendar user interface 77 in the selection region 76 of the Due Date interactive content pane 325 may be automatically generated upon a user clicking in the content region 74. It will further be appreciated that interactive content panes may be embedded if they contain related content. For example, as discussed above, the interactive content pane 300 is designated to hold text associated with an active issue while the interactive content pane 325 holds a date or dates associated with the active issue (e.g., an estimated completion date for the active issue).

FIG. 3B includes the interactive content pane 350 which further includes a "Resolved Issue" label 80, a selection region 82, a content region 84 for receiving "Resolved Issue Text," and a notification region 88. Embedded interactive content pane 375 includes a "Resolved Date" label 90, a content region 74 with a date restriction for receiving "Resolved Date Text," a selection region 96 (including a calendar user interface 97) and a notification region 98. It will be appreciated that the content panes may "inherit" values from other interactive content panes containing related content. For instance, the active issue text in the interactive content pane 300 may be linked to the interactive content pane 350 by the word processing application program 40 so that the Active Issue Text is automatically copied into the content region 84 when the interactive content pane 350 is inserted into a document by a user. Similarly, the due date text in the interactive content pane 325 may be linked to the interactive content pane 375 so that the Due Date Text is automatically copied into the content region 94 when the interactive content pane 375 is inserted into a document by a user. If the linked data is not accurate (e.g., the Active Issue was completed after the Due Date in the content region 74), the linked interactive content pane may be updated by selecting new specific content (e.g., a new date) in the selection region.

Figure 4:
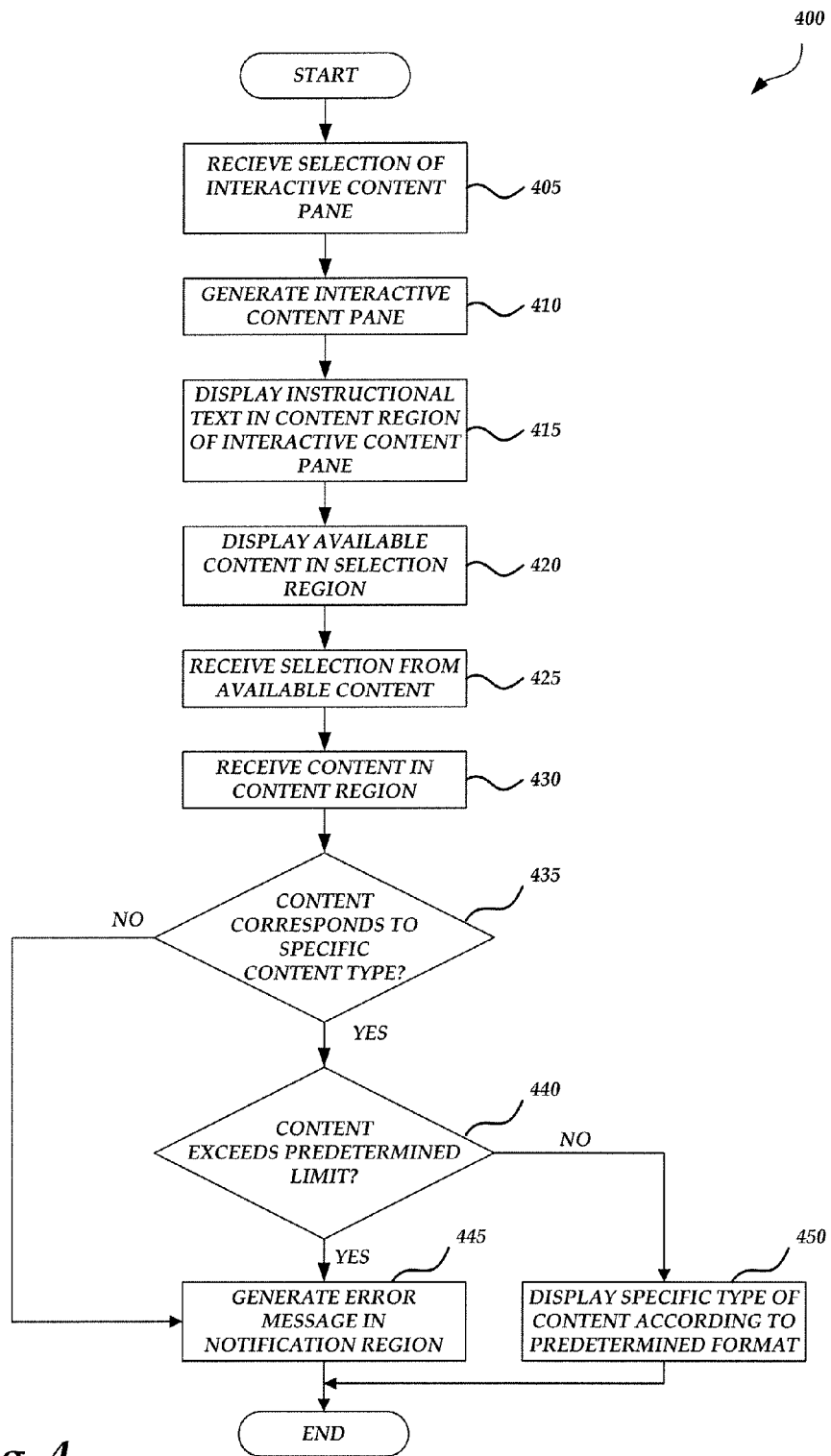
FIGS. 4 and 5 are illustrative routines performed by an application program in the computer system of FIG. 1 for receiving and displaying specific types of content in an interactive content pane inserted into an electronic document, according to an illustrative embodiment of the invention.
Figure 5:
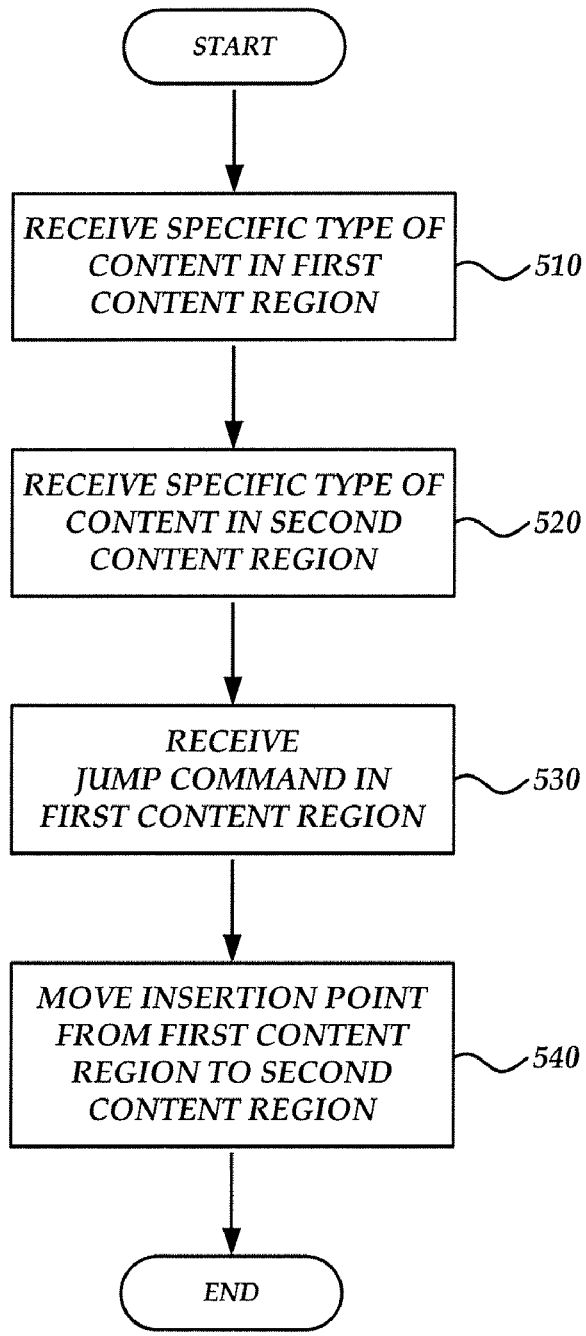

Referring now to FIGS. 4 and 5, illustrative routines 400 and 500 will be described illustrating processes performed by the word processing application program 40 for receiving and displaying specific types of content in an interactive content pane inserted into an electronic document. It should be appreciated that although the embodiments of the invention described herein are presented in the context of the word processing application program 40, the invention may be utilized in other types of application programs that support text and data processing. For instance, the embodiments of the invention described herein may be utilized within a spreadsheet application program, a presentation application program, a drawing or computer-aided design application program, or a database application program.

When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 4-5, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

Referring now to FIG. 4, the routine 400 begins at operation 405, wherein the word processing application program 40 receives a selection of an interactive content pane (such as the interactive content pane 48 discussed above with respect to FIG. 2). In particular, the interactive content pane may be selected based on a specific type of content desired to be displayed in an electronic document. For instance, a user may select an interactive content pane from a list of labels corresponding to the labels making up the interactive content pane user interface (discussed above with respect to FIG. 2). For instance, a user wishing to enter text in an Objective section in a resume may select an interactive content pane labeled "Objective."

The routine 400 continues from operation 405 to operation 410, where the word processing application program 40 generates the selected interactive content pane in an electronic document. The routine 400 continues from operation 410 to operation 415, where the word processing application program 40 displays the appropriate instructional text in the content region of the generated content pane. For instance, if an interactive content pane is selected for inserting graphics data, the instructional text may be displayed as "Insert your photo here."

The routine 400 continues from operation 415 to operation 420, where the word processing application program 40 displays available content for insertion in the content region in the selection region of the interactive content pane. It will be appreciated that the selection region may display a variety of content based on the type of content defined by the interactive content pane. For instance, the selection region may display a selection of document fragments, photographs, a calendar, or other data.

The routine 400 continues from operation 420 to operation 425, where the word processing application program 40 receives a selection of the displayed content in the selection region which is then received (or inserted) into the content region at operation 430. It will be appreciated that the specific content received into the content region replaces the displayed instructional text. It should be understood that in some instances, a user may choose not to use the selection region for inserting content into the content region of an interactive content pane. For instance, a user wishing to enter text into a document may simply enter the text directly into the content region by using a mouse to click on the instructional text which is replaced with blank space. The user may then enter the specific content directly into the area previously occupied by the instructional text in the content region.

The routine 400 continues from operation 430 to operation 435, where the word processing application program 40 validates the content received in the content region of the interactive content pane by comparing the received content to the specific content type designated by the label for the interactive content pane. For instance, a user may choose to enter text directly into a content region restricted to calendar data. If, at operation 435 the content in the content region does not correspond to the specific content type designated for the content region, the routine 400 branches from operation 435 to operation 445, where the word processing application program 40 generates an error message in the notification region of the interactive content pane. In particular, the error message alerts the user that incorrect content has been entered into the interactive content pane.

If, at operation 435, the content in the content region does correspond to the specific content type designated for the content region, the routine 400 branches from operation 435 to operation 440, where the word processing application program 40 continues the validation process by determining whether the content received in the content region has exceeded a predefined limit. As discussed above in the discussion of FIG. 1, the word processing application program 40 may utilize interactive content panes to restrict the specific types of content which may be entered into a document. For instance, an interactive content pane may limit the number of lines in a paragraph to fifteen lines. If, at operation 440, the word processing application program 40 determines that the content received in the content region has exceeded a predefined limit (e.g., the content region contains a paragraph of text having sixteen lines), the routine 400 continues from operation 440 to operation 445, where the word processing application program 40 generates an error message in the notification region of the interactive content pane. In particular, the error message alerts the user that the predefined limit for the interactive content pane has been exceeded.

If, at operation 440, the word processing application program 40 determines that the content received in the content region has not exceeded a predefined limit the routine 400 branches from operation 440 to operation 450, where the word processing application program 40 displays the specific type of content in the content region of an interactive content pane according to a predetermined format. In particular, an interactive content pane may be defined to display specific content which is consistent with one or more predetermined formatting properties (e.g., bold, italic, underline, font color, or font size). The routine 400 then ends.

Referring now to FIG. 5, the routine 500 begins at operation 510, where the word processing application program 40 receives a specific type of content in a first content region in a document having embedded or multiple interactive content panes (such as the interactive content panes 300, 325, 350, and 375 discussed above with respect to FIG. 3). The routine 500 continues from operation 510 to operation 520, where the word processing application program 40 receives specific type of content in a second content region in the document. The routine 500 continues from operation 520 to operation 530, where the word processing application program 40 receives a "jump" command in the first content region. For instance, the "jump" command may comprise a TAB keyboard command executed by a user from a keyboard. The routine 500 continues from operation 530 to operation 540, where the word processing application program 40 "jumps" from one content region to another by moving an insertion point in the first content region to the second content region. In particular, while a user is entering content in a first content region, he or she may navigate to a second content region in the same document. The routine 500 then ends.

Based on the foregoing, it should be appreciated that the various embodiments of the invention include a method and apparatus and computer-readable medium for managing specific types of content in an electronic document. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for navigating among specific types of stored content in a plurality of predefined areas of an electronic document, the method comprising:

generating first and second interactive content panes in the electronic document, wherein the first interactive content pane includes therein a first content region, a first selection region, and a first label region affixed to the first interactive content pane, and wherein the second interactive content pane includes therein a second content region, a second selection region, and a second label region affixed to the second interactive content pane, and wherein the first and second interactive content panes are associated with the electronic document; wherein each of the content regions is displayed within the electronic document such that content received in the content regions is displayed in the electronic document at locations associated with the respective content regions;

identifying a first specific type of content for the first content region in a first predefined area of the plurality of predefined areas in the electronic document;

validating content received in the content region based on the first specific type of content;

validating the specific type of content received in the content region based on a predefined content restriction;

identifying a second specific type of content for the second content region in a second predefined area of the plurality of predefined areas in the electronic document;

receiving a jump command in the first content region; and in response to receiving the jump command, moving an insertion point from the first content region of the first interactive content pane to the second content region of the second interactive content pane when the first specific type of content and the second specific type of content match.

2. The method of claim 1 further comprising sharing data in the second content region associated with the specific type of content received in the first content region.

3. The method of claim 1, wherein identifying the first specific type of content comprises identifying the first specific type of content comprising at least one of the following: text data, date data, table data, and graphics data.

4. The method of claim 1, wherein identifying the second specific type of content comprises identifying the second specific type of content comprising at least one of the following: text data, date data, table data, and graphics data.

5. The method of claim 1, wherein identifying the first specific type of content comprises identifying the first specific type of content wherein the first specific type of content is automatically formatted according to a predetermined format.

6. The method of claim 1, wherein identifying the second specific type of content comprises identifying the second specific type of content wherein the second specific type of content is automatically formatted according to a predetermined format.

7. The method of claim 1, wherein generating the first interactive content pane comprises generating the first interactive content pane further comprising a boundary for defining the first content region.

8. The method of claim 1, wherein generating the second interactive content pane comprises generating the second interactive content pane further comprising a boundary for defining the second content region.

9. A computer-readable storage medium that stores a set of instructions which when executed perform a method for navigating among specific types of stored content in a plurality of predefined areas of an electronic document, the method executed by the set of instructions comprising:

generating first and second interactive content panes in the electronic document, wherein the first interactive content pane includes therein a first content region, a first selection region, and a first label region affixed to the first interactive content pane, and wherein the second interactive content pane includes therein a second content region, a second selection region, and a second label region affixed to the second interactive content pane, and wherein the first and second interactive content panes are associated with the electronic document; wherein each of the content regions is displayed within the electronic document such that content received in the content regions is displayed in the electronic document at locations associated with the respective content regions;

identifying a first specific type of content for the first content region in a first predefined area of the plurality of predefined areas in the electronic document;

validating content received in the content region based on the first specific type of content;

validating the specific type of content received in the content region based on a predefined content restriction;

identifying a second specific type of content for the second content region in a second predefined area of the plurality of predefined areas in the electronic document;

receiving a jump command in the first content region; and in response to receiving the jump command, moving an insertion point from the first content region of the first interactive content pane to the second content region of the second interactive content pane when the first specific type of content and the second specific type of content match.

10. The computer-readable storage medium of claim 9, further comprising sharing data in the second content region associated with the specific type of content received in the first content region.

11. The computer-readable storage medium of claim 9, wherein identifying the first specific type of content comprises identifying the first specific type of content comprising at least one of the following: text data, date data, table data, and graphics data.

12. The computer-readable storage medium of claim 9, wherein identifying the second specific type of content comprises identifying the second specific type of content comprising at least one of the following: text data, date data, table data, and graphics data.

13. The computer-readable storage medium of claim 9, wherein identifying the first specific type of content comprises identifying the first specific type of content wherein the first specific type of content is automatically formatted according to a predetermined format.

14. The computer-readable storage medium of claim 9, wherein identifying the second specific type of content comprises identifying the second specific type of content wherein the second specific type of content is automatically formatted according to a predetermined format.

15. The computer-readable storage medium of claim 9, wherein generating the first interactive content pane comprises generating the first interactive content pane further comprising a boundary for defining the first content region.

16. The computer-readable storage medium of claim 9, wherein generating the second interactive content pane comprises generating the second interactive content pane further comprising a boundary for defining the second content region.

17. A system for navigating among specific types of stored content in a plurality of predefined areas of an electronic document, the system comprising:
   a memory storage; and
   a processing unit coupled to the memory storage, wherein the processing unit is operative to:
      generate first and second interactive content panes in the electronic document, wherein the first interactive content pane includes therein a first content region, a first selection region, and a first label region affixed to the first interactive content pane, and wherein the second interactive content pane includes therein a second content region, a second selection region, and a second label region affixed to the second interactive content pane, and wherein the first and second interactive content panes are associated with the electronic document; wherein each of the content regions is displayed within the electronic document such that content received in the content regions is displayed in the electronic document at locations associated with the respective content regions;
      identify a first specific type of content for the first content region in a first predefined area of the plurality of predefined areas in the electronic document;
      validate content received in the content region based on the first specific type of content;
      validate the specific type of content received in the content region based on a predefined content restriction;
      identify a second specific type of content for the second content region in a second predefined area of the plurality of predefined areas in the electronic document;
      receive a jump command in the first content region; and
      in response to receiving the jump command, move an insertion point from the first content region of the first interactive content pane to the second content region of the second interactive content pane when the first specific type of content and the second specific type of content match.

18. The system of claim 17, further comprising the processing unit being operative to share data in the second content region associated with the specific type of content received in the first content region.

19. The system of claim 17, wherein the processing unit being operative to identify the first specific type of content comprises the processing unit being operative to identify the first specific type of content comprising at least one of the following: text data, date data, table data, and graphics data.

20. The system of claim 17, wherein the processing unit being operative to identify the second specific type of content comprises the processing unit being operative to identify the second specific type of content comprising at least one of the following: text data, date data, table data, and graphics data.

* * * * *